United States Patent

Uitti

[11] 3,981,969
[45] Sept. 21, 1976

[54] PRESSURIZED COLUMN SOLVENT EXTRACTION OF NICKEL FROM AMMONIACAL SOLUTIONS

[75] Inventor: Kenneth D. Uitti, Des Plaines, Ill.
[73] Assignee: UOP Inc., Des Plaines, Ill.
[22] Filed: Oct. 15, 1975
[21] Appl. No.: 622,584

[52] U.S. Cl. .............................. 423/139; 423/544; 423/658.5
[51] Int. Cl.² ........................................ C01G 53/10
[58] Field of Search ................. 423/139, 658.5, 544; 75/101 BE, 119; 204/112

[56] References Cited
UNITED STATES PATENTS

| | | | |
|---|---|---|---|
| 2,746,846 | 5/1956 | Grunewald et al. | 423/658.5 |
| 3,276,863 | 10/1966 | Drobnick | 423/139 |
| 3,380,801 | 4/1968 | Williams et al. | 423/139 |
| 3,743,585 | 7/1973 | Lowenhaupt et al. | 75/119 |
| 3,794,719 | 2/1974 | Lowenhaupt et al. | 423/139 |

Primary Examiner—Oscar R. Vertiz
Assistant Examiner—Brian E. Hearn
Attorney, Agent, or Firm—James R. Hoatson, Jr.; Robert W. Erickson; William H. Page, II

[57] ABSTRACT

Nickel values are recovered from ammoniacal solutions in a continuous solvent extraction process utilizing a plurality of elongated columns containing a multiplicity of spaced-apart, perforated trays, or decks. The organic solvent constitutes an oxime and at least one species of hydrocarbon diluent having from three to seven carbon atoms per molecule. Elevated pressures in the range of about 100 to 1,000 psig. (7.03 to 70.3 kg/sq.cm.) are utilized.

10 Claims, 1 Drawing Figure

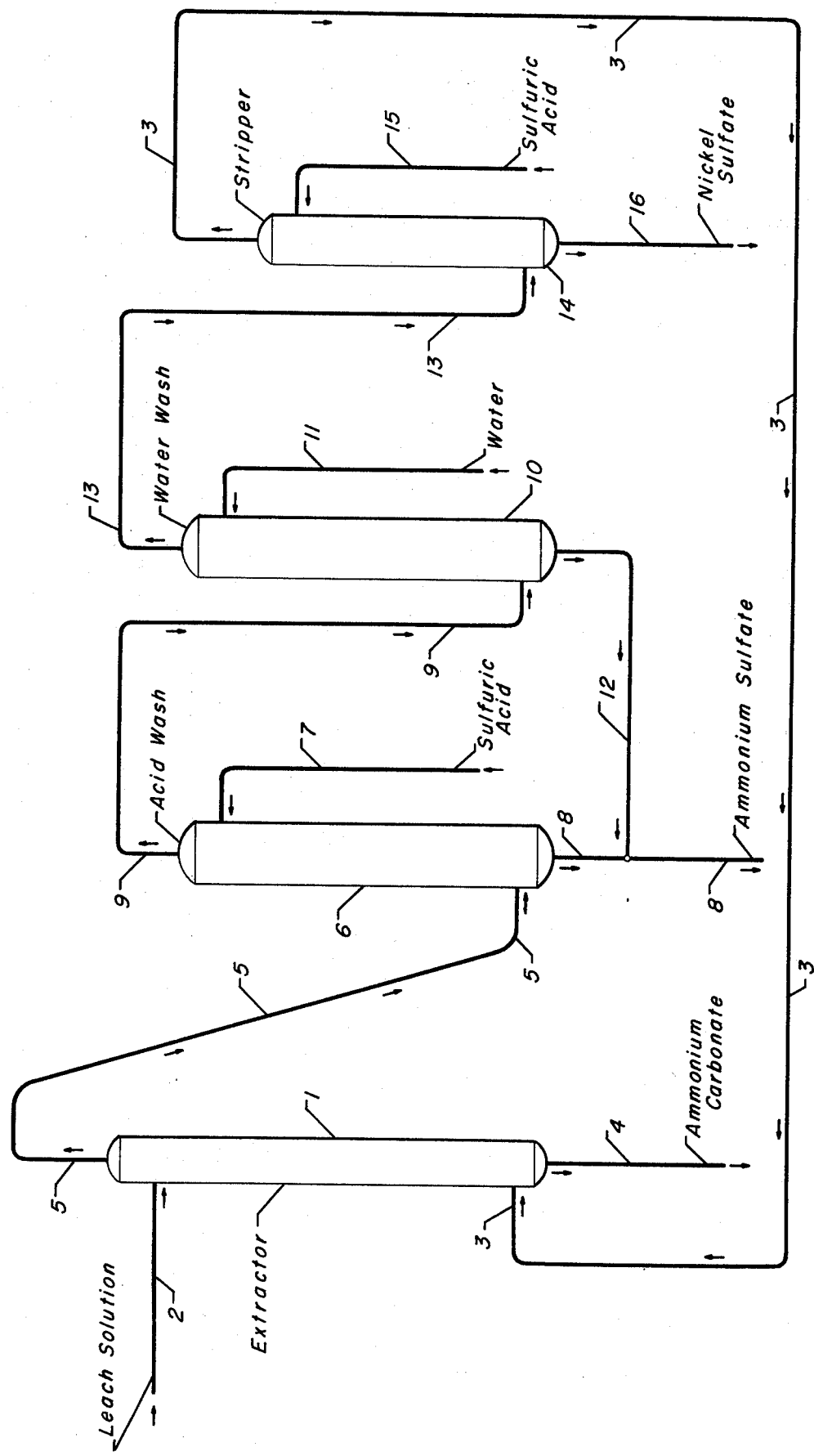

PRESSURIZED COLUMN SOLVENT EXTRACTION OF NICKEL FROM AMMONIACAL SOLUTIONS

APPLICABILITY OF INVENTION

The invention herein described is directed in general to the recovery of nickel values from ores containing the same. More specifically, my invention encompasses a process for recovering nickel values from an ammoniacal solution, particularly the common ammoniacal leaching solution. Historically, nickel values, generally in the form of oxides and silicates, are recovered from finely-divided ores by leaching with either an acid, such as sulfuric acid, or with an ammonia leach solution. Although other techniques, as hereafter set forth, may be used in recovering nickel from its natural ore, leaching appears to be the most prevalent. While the present invention is specifically directed toward extracting nickel values from an ammoniacal solution, slight modifications will make it applicable to acidic leach solutions.

Briefly, the present process involves solvent extraction at elevated temperatures and pressures, the latter in the range of about 100 to about 1,000 psig., and utilizes multiple elongated columns containing a plurality of spaced-apart trays or decks. These columns are similar to those commonly employed as closed pressure vessel extractors, for, as an example, the solvent extraction of aromatic hydrocarbons from a mixture thereof with non-aromatic hydrocarbons. As hereinafter stated, the present process utilizes an organic solvent similar to those employed in prior art processes in that it comprises a solution of an oxime in a hydrocarbon. The principal difference resides in the type of hydrocarbon, and is that consideration which allows the use of advantageous elevated pressures.

OBJECTS AND EMBODIMENTS

A principle object of my invention is to recover nickel values from a leaching solution containing the same. A corollary objective is to recover nickel values from an ammoniacal leach solution through the use of multi-stage countercurrent extraction utilizing an organic solvent.

A more specific object of the present invention is to provide a more economical and efficient nickel recovery process which is less hazardous to the environment in its operation. Another specific object is to afford an elevated pressure process which permits the utilization of an organic solvent comprising an oxime and a low molecular weight hydrocarbon.

Therefore, in one embodiment, the present invention is directed toward a process for the recovery of nickel from an ammoniacal solution which comprises the steps of: (a) introducing a nickel-containing ammoniacal solution into a solvent extraction first column containing a plurality of spaced-apart perforated trays, or decks, and therein countercurrently contacting said ammoniacal solution, at a superatmospheric pressure in the range of about 100 to about 1,000 psig., with an organic solvent comprising an oxime and at least one hydrocarbon having from about three to about fifteen carbon atoms per molecule, and recovering a first solvent-rich, nickel-containing stream of reduced ammonia concentration; (b) introducing said first solvent-rich stream into a second column containing a plurality of spaced-apart perforated trays, or decks, and therein countercurrently contacting said first solvent-rich stream, at substantially the same pressure, with sulfuric acid, to provide (i) a solvent-lean ammonium sulfate stream and, (ii) a second solvent-rich, nickel- and free ammonium sulfate-containing stream; (c) introducing said second solvent-rich stream into a third column containing a plurality of spaced-apart perforated trays, or decks, and therein countercurrently contacting said second solvent-rich stream, at substantially the same pressure, with water to provide (i) an aqueous ammonium sulfate stream and, (ii) a third solvent-rich, nickel-containing stream substantially free from ammonium sulfate; (d) introducing said third solvent-rich stream into a fourth column containing a plurality of spaced-apart perforated trays, or decks, and therein countercurrently contacting said third solvent-rich stream, at substantially the same pressure, with sulfuric acid to provide (i) a fourth solvent-rich stream, substantially free from nickel, and, (ii) a concentrated nickel sulfate stream; and, (e) recovering said concentrated nickel sulfate steam from said fourth column.

Other objects and embodiments of my invention will become evident from the following, more detailed description thereof. In one such other embodiment, the concentration of the oxime in the organic solvent is in the range of about 2.0% to about 40.0%, by weight. Further, the volumetric ratio of the organic solvent to the ammoniacal solution, in the solvent extraction column, is from about 2.0:1.0 to about 30.0:1.0.

PRIOR ART

It must necessarily be recognized and acknowledged that the use of an oxime-containing organic solvent, to recover metal values (principally nickel and copper) from leaching solutions, whether acidic, or ammoniacal, is not of itself a new technique. The appropriate prior art is replete with descriptions of such processes, as well as the character of the oxime employed therein. For example, U.S. Pat. No. 3,276,863 (Cl. 75-108) involves a process for the separation of nickel and cobalt values utilizing an organic solvent comprising an a-hydroxy oxime. Similarly, U.S. Pat. No. 3,428,449 (Cl. 75-117) is directed toward the utilization of phenolic oximes to extract copper values from acidic liquors.

U.S. Pat. No. 3,224,873 (Cl. 75-101) also relates to the recovery of copper valves from leaching solutions, employing an organic solvent comprising an a-hydroxy oxime and a liquid hydrocarbon solvent, the latter including fuel oil and kerosene.

U.S. Pat. No. 3,455,680 (Cl. 75-117) employs an a-hydroxy oxime (LIX-63) in admixture with an organic phosphoric acid compound to separate copper from an acid leach solution also containing nickel and cobalt values. U.S. Pat. No. 3,855,090 (Cl. 204-106) is directed toward a process for separately recovering copper and nickel from an oxime extractant stream, and in which individual stripping and electowining zones are employed to separately recover the copper and nickel.

U.S. Pat. No. 3,365,341 (Cl. 75-119) discloses a process for extracting nickel from a nickel-containing ore wherein the finely-divided ore is admixed with a water slurry of finely-divided sulfur and heated under pressure to convert the nickel to a nickel sulfide. Metallic nickel is recovered via pyrometallurgical, or electrolysis methods. No mention is made of metal value extraction with an oxime-containing organic solvent.

The present process is distinguishable in many respects, not the least of which is the technique of countercurrent extraction in an elongated column containing a plurality (about 10 to about 40) of spaced-apart perforated trays, or decks. Also, the present process employs low molecular weight hydrocarbons, containing from three to about seven carbon atoms per molecule, as the solvent for the oxime, and utilizes the same at elevated pressures in the range of about 100 to 1,000 psig.

SUMMARY OF INVENTION

In recovering nickel values from an ammoniacal leaching solution, the present process utilizes four individual zones, each of which constitutes an elongated column containing from about 10 to about 40 spaced-apart perforated trays, or decks, and all of which effect their intended function via countercurrent flow under an elevated pressure ranging from about 100 to about 1,000 psig. Metal value recovery processes appear to prefer ammonia leaching to acid leaching, the former effected by leaching finely-divided ore with a mixture of ammonia and ammonium carbonate. The recovered metal value, for example, nickel, is in the form of a complex with aqueous ammonium carbonate. Initially, in accordance with the present process, the nickel-containing ammoniacal solution is subjected to countercurrent solvent extraction using an organic solvent of an oxime and at least one hydrocarbon having from three to about fifteen carbon atoms per molecule, and preferably up to about seven carbon atoms per molecule. A solvent-rich, nickel-containing stream is recovered as the extract stream, and solvent-lean ammonium carbonate is recovered as the raffinate stream. The former is subjected to a countercurrent acid wash, using dilute sulfuric acid, to remove additional ammonium ions, as a solvent-lean ammonium sulfate raffinate stream. The solvent-rich extract stream, containing nickel values and free ammonium sulfate, is subjected to countercurrent water washing to remove additional ammonium sulfate. Concentrated sulfuric acid is countercurrently employed in a stripping column to free the organic solvent and to recover the nickel values as nickel sulfate. The organic oxime solvent is recycled to the first, solvent extraction column.

Currently-practiced methods generally utilize an oxime dissolved in kerosene, and the nickel values are countercurrently extracted in a plurality of so-called mixer-settler stages, requiring multitudinous intermediate pumps to transfer the extract and raffinate from one stage to the next succeeding stage. Through the use of elongated columns, functioning under superatmospheric pressure light, low molecular weight hydrocarbons can be used as the solvent for the oxime, and the extraction can be effected at a wider range of temperatures — i.e. 40°F. to about 500°F. (4.5°C. to about 260°C.). Kerosene, or fuel oil, must be used in the common open-tank, mixer-settler decantation techniques because of the fire hazard. Open tanks also lead to gum formation, with respect to the hydrocarbon solvent, due to contact with atmospheric oxygen.

The ability to utilize light hydrocarbon solvents in countercurrent extraction has the advantages of lower specific gravity and lower viscosity. Lower specific gravity of the lighter phase facilitates settling due to the greater phase density difference. Utilizing elevated pressure affords a less expensive nickel recovery unit having a lesser amount of appurtenances, particularly inter-stage pumps, one which necessitates less maintenance, and in which there is less gum formation. The present process utilizes four extractor type columns, without intermediate pumps, all of which function at substantially the same pressure; that is, each succeeding column functions at a pressure slightly less than that of the preceding column due only to the pressure drop experienced as a normal result of fluid flow throughout the system. Overall pressure drop is minimal due to the use of the light hydrocarbon as the solvent for the oxime.

The pressure imposed upon the first, solvent extraction column is in the range of about 100 to about 1,000 psig., and preferably from about 200 to about 600 psig. (14.06 to 42.18 kg./sq.cm.). Since the use of the light hydrocarbon solvent effects a decrease in pressure drop in the first column, and therefore throughout the entire overall unit, the fourth column will function at a pressure about 9 to about 30 psig. (0.63 to 2.11 kg./sq.cm.) lower than the extraction column, or an average pressure drop per column of about 3 to about 10 psig. Each of the four columns will function at temperatures in the range of about 40°F. to about 500°F., preferably 50°F. to about 400°F. (10°C. to about 204°C.). These elevated temperatures enhance the kinetics involved, particularly with respect to stripping the nickel from the organic solvent.

ORGANIC SOLVENT

The organic solvent herein utilized comprises an oxime and at least one hydrocarbon preferably having from three to about seven carbon atoms per molecule. Suitable hydrocarbons include, therefore, propane, normal butane, isobutane, normal pentane, isopentane, neopentane, hexane, isohexane, heptane, isoheptane, the mono-olefinic counterparts and mixtures thereof, etc. Particularly preferred is isopentane, normal butane/isopentane, propane/isobutane and propane/normal butane. The concentration of oxime in the organic solvent is in the range of about 2.0% to about 40.0% by weight, and preferably 5.0% to about 20.0%. The volumetric ratio of the organic solvent to the ammoniacal solution in the first, solvent extraction column is primarily determined by the nickel concentration in the feed stream, or the ammoniacal solution. Generally, the volumetric ratio of the organic solvent to the ammoniacal solution will be in the range of about 2.0:1.0 to about 30.0:1.0. Since the nickel concentration in the feed stream will be virtually constantly changing, the volumetric ratio of solvent/ammoniacal solution must necessarily fluctuate considerably.

An oxime constitutes any of a series of compounds formed by the action of hydroxylamine on an aldehyde or ketone, in which the oxygen atom of the CHO group of the aldehyde, or of the CO group of the ketone, is replaced by the NOH group of hydroxylamine. Thus, the oxime may be relatively simple, for example as formed by the reaction of hydroxylamine with formaldehyde, acetaldehyde, propionaldehyde, n-butyraldehyde, benzaldehyde, acetone, methyl ethyl ketone, diethyl ketone, methyl n-propyl ketone, isopropyl methyl ketone, cyclohexanone, etc. The selection of any particular oxime, or mixture thereof, is not considered a feature limiting the present invention. It is contemplated, within the range and spirit of the appended claims, that the oximes — e.g. an a-hydroxy oxime — disclosed in the prior art previously discussed, are suitable for use, in conjunction with a light hydrocarbon, as the organic solvent.

The nickel recovery process encompassed by the present invention will be further described with reference to the accompanying drawing. The drawing is representated as a simplified flow diagram in which details such as pumps, instrumentation and controls, heat-exchange and heat-recovery circuits, valving, start-up lines and similar hardware omitted as being non-essential to an understanding of the techniques involved. The utilization of such miscellaneous appurtenances, to modify the illustrated process flow is well within the purview of those having the requisite skill in the appropriate art.

DESCRIPTION OF DRAWING

With specific reference now to the drawing, an ammoniacal leach solution, in the amount of about 1,490 gal./min. (5,639.7 liters/min.) is introduced into the upper portion of solvent extraction column 1 by way of line 2. An organic solvent, comprising about 15.0% by weight of an a-hydroxy oxime (LIX-64) dissolved in a 50/50 volumetric mixture of n-butane and isopentane, is introduced into extraction zone 1 through line 3, at a rate of about 7,400 gal./min. (28,009 liters/min.), or at an organic solvent/ammoniacal solution volumetric ratio of about 4.97:1.0. The ammoniacal leach solution contains approximately 0.10 lbs./gal. (12.0 grams/liter) of nickel, calculated as the elemental metal. The metal loading of extractor 1 is, therefore, 140 lbs./min. Solvent extractor 1 contains about 15 spaced-apart perforated trays, or decks, and the organic solvent stream is the dispersed phase. A denuded ammonium carbonate stream is withdrawn from the bottom of extraction zone 1 by way of line 4, and may be recycled to the ammonia leaching facility. A solvent-rich, nickel-containing extract stream, of reduced ammonia concentration, is recovered in line 5. Solvent extraction zone 1 is maintained at a pressure of about 300 psig. (21.1 kg./sq.cm.) and a temperature of about 140°F. (60°C.).

The solvent-rich extractant stream in line 5 is introduced into the lower portion of acid wash column 6 at substantially the same pressure and temperature; that is, there is no necessity for increasing the pressure by way of pumping means. Whatever minor pressure drop and temperature loss is experienced as a result of fluid flow from extractor 1 to acid wash column 6, need not be considered, or compensated for in the latter. A dilute sulfuric acid-wash stream, from line 7, countercurrently contacts the upwardly-flowing solvent-rich stream, and provides a solvent-lean ammonium sulfate stream in line 8 and a solvent-rich nickel- and free ammonium sulfate-containing stream in line 9. Acid-wash column 6 will contain about 12 spaced-apart perforated trays, or decks.

The last traces of ammonium sulfate in the solvent-rich stream in line 9 are removed in water-wash column 10. Sufficient water for this purpose is introduced via line 11, and countercurrently contacts the solvent-rich stream introduced via line 9. The water wash column, containing about 10 spaced-apart perforated trays, provides an aqueous ammonium sulfate stream in line 12, which may be conveniently combined with the ammonium sulfate stream in line 8, and, in line 13, a third solvent-rich, nickel-containing stream, substantially free from ammonium sulfate. The latter is introduced into nickel stripping column 14, and countercurrently contacts therein a concentrated sulfuric acid stream introduced via line 15. The stripping zone 15 contains about 20 spaced-apart, perforated trays. Nickel sulfate is recovered through line 16 at a temperature of about 122°F. (50°C.) and a pressure of about 270 psig. (19.71 kg./sq.cm.). The "freed" organic solvent is withdrawn from stripping column 14 through line 9, is increased in pressure to about 300 psig. and recycled to extraction column 1. Judicious operating techniques generally dictate the introduction into the system of make-up organic solvent to compensate for that lost in the various streams withdrawn from the columns. Such make-up solvent may be introduced, from an external source not illustrated, into any suitable locus in line 3, and preferably upstream of the pump which increases the pressure of the recycled organic solvent.

The present process will recover more than 90% of the available nickel values (computed as elemental) in the ammoniacal solution feed stream. Recovered nickel, as nickel sulfate in line 16, is transported therethrough to a suitable electrolysis, or electrowining facility. Based upon a metal loading of 140 lbs./min. of nickel, the process as illustrated produces a nickel sulfate stream containing about 84.6 metric tons of nickel, or an average nickel recovery approximating 92.5%.

The foregoing specification, and particularly the description of the illustrated embodiment, clearly indicates the method by which the present process is effected and the benefits to be afforded through the utilization thereof. As will be recognized by those skilled in the art, as compared to current techniques involving atmospheric extraction and stripping in a plurality of mixer-settlers, the present process can be effected in a less expensive unit containing less miscellaneous hardware (pumps especially), requires less maintenance and offers significantly less chance of a fire hazard.

I claim as my invention:

1. A process for the recovery of nickel from an ammoniacal solution which comprises the steps of:
   a. introducing a nickel-containing ammoniacal solution into a solvent extraction first column containing a plurality of spaced-apart perforated trays, or decks, and therein countercurrently contacting said ammoniacal solution, at a superatmospheric pressure in the range of about 100 to about 1,000 psig., with an organic solvent comprising an oxime and at least one hydrocarbon having from about three to about fifteen carbon atoms per molecule, and recovering a first solvent-rich, nickel-containing stream of reduced ammonia concentration;
   b. introducing said first solvent-rich stream into a second column containing a plurality of spaced-apart perforated trays, or decks, and therein countercurrently contacting said first solvent-rich stream, at substantially the same pressure, with sulfuric acid, to provide (i) a solvent-lean ammonium sulfate stream and, (ii) a second solvent-rich, nickel- and free ammonium sulfate-containing stream;
   c. introducing said second solvent-rich stream into a third column containing a plurality of spaced-apart perforated trays, or decks, and therein countercurrently contacting said second solvent-rich stream, at substantially the same pressure, with water to provide (i) an aqueous ammonium sulfate stream and, (ii) a third solvent-rich, nickel-containing stream substantially free from ammonium sulfate;

d. introducing said third solvent-rich stream into a fourth column containing a plurality of spaced-apart perforated trays, or decks, and therein countercurrently contacting said third solvent-rich stream, at substantially the same pressure, with sulfuric acid to provide (i) a fourth solvent-rich stream, substantially free from nickel, and, (ii) a concentrated nickel sulfate stream; and, e. recovering said concentrated nickel sulfate stream from said fourth column.

2. The process of claim 1 further characterized in that said fourth solvent-rich stream is at least in part recycled to said solvent extraction, first column to countercurrently contact said ammoniacal solution therein.

3. The process of claim 1 further characterized in that the pressure within said solvent extraction column is in the range of about 200 to about 600 psig.

4. The process of claim 1 further characterized in that said organic solvent comprises a solution of an oxime in a mixture of normal butane and isopentane.

5. The process of claim 1 further characterized in that said organic solvent comprises a solution of an oxime in a mixture of propane and normal butane.

6. The process of claim 1 further characterized in that said organic solvent comprises a solution of an oxime in a mixture of propane and isobutane.

7. The process of claim 1 further characterized in that said organic solvent comprises a solution of an oxime in isopentane.

8. The process of claim 1 further characterized in that the concentration of oxime in said organic solvent is in the range of about 2.0% to about 40.0%, by weight.

9. The process of claim 1 further characterized in that said first, second, third and fourth columns are maintained at temperatures of from 40°F. to 500°F.

10. The process of claim 1 further characterized in that the volumetric ratio of said organic solvent to said ammoniacal solution is in the range of about 2.0:1.0 to about 30.0:1.0.

* * * * *